(12) United States Patent
Lasater et al.

(10) Patent No.: US 10,899,182 B2
(45) Date of Patent: Jan. 26, 2021

(54) TRACTOR HITCH

(71) Applicants: Nathan Lasater, Waukomis, OK (US); Dru H. Voss, Goltry, OK (US)

(72) Inventors: Nathan Lasater, Waukomis, OK (US); Dru H. Voss, Goltry, OK (US)

(*) Notice: Subject to any disclaimer, the term of this patent is extended or adjusted under 35 U.S.C. 154(b) by 268 days.

(21) Appl. No.: 16/103,520

(22) Filed: Aug. 14, 2018

(65) Prior Publication Data
US 2019/0054782 A1    Feb. 21, 2019

Related U.S. Application Data

(60) Provisional application No. 62/545,761, filed on Aug. 15, 2017.

(51) Int. Cl.
| | |
|---|---|
| *B60D 1/02* | (2006.01) |
| *B60D 1/26* | (2006.01) |
| *A01B 59/042* | (2006.01) |
| *B60D 1/62* | (2006.01) |
| *A01B 59/00* | (2006.01) |
| *B60D 1/00* | (2006.01) |

(52) U.S. Cl.
CPC ............ *B60D 1/025* (2013.01); *A01B 59/002* (2013.01); *A01B 59/042* (2013.01); *B60D 1/26* (2013.01); *B60D 1/62* (2013.01); *B60D 2001/008* (2013.01)

(58) Field of Classification Search
CPC .... B60D 1/025; B60D 2001/008; A01B 59/02
See application file for complete search history.

(56) References Cited

U.S. PATENT DOCUMENTS

| | | | |
|---|---|---|---|
| 2,937,887 A | 5/1960 | Richman | |
| 3,511,317 A | 5/1970 | Richey | |
| (Continued) | | | |

FOREIGN PATENT DOCUMENTS

| | | |
|---|---|---|
| BR | 1101159 | 3/2015 |
| EP | 0812711 | 11/2001 |
| EP | 2540149 | 1/2014 |

OTHER PUBLICATIONS

Deere & Company, Height Adjustable Trailer Hitch-If Equipped, 2013, pp. 1-2.

(Continued)

*Primary Examiner* — Tony H Winner
(74) *Attorney, Agent, or Firm* — McAfee & Taft

(57) ABSTRACT

In accordance with one series of embodiments of the current disclosure, there is provided a tractor hitch system for hitching a tractor to a trailing implement. The tractor hitch system comprises a base, an actuator, a pin and a lever arm. The base is configured to be mountable on a drawbar of the tractor. The actuator is movable between a first position and a second position. The lever arm is attached to the base, connected to the actuator, and attached to the pin. The attachment of the lever arm to the pin allows the pin to pivot and move laterally with respect to the lever arm such that, when the actuator is in the first position, the pin engages the drawbar so as to be able to couple the tractor to the trailing implement, and when the actuator is in the second position, the pin is disengaged from the drawbar so that the tractor is not coupled to the trailing implement.

14 Claims, 15 Drawing Sheets

(56) References Cited

U.S. PATENT DOCUMENTS

| | | | |
|---|---|---|---|
| 3,889,979 A | 6/1975 | Schmiesing | |
| 4,015,855 A * | 4/1977 | Murray | B60D 1/02 |
| | | | 280/416.2 |
| 4,368,899 A * | 1/1983 | Smalley | B60D 1/04 |
| | | | 280/421 |
| 4,408,778 A | 10/1983 | Steuben | |
| 4,431,207 A * | 2/1984 | Langenfeld | B60D 1/02 |
| | | | 172/248 |
| 5,029,650 A | 7/1991 | Smit | |
| 5,286,050 A * | 2/1994 | Stallings, Jr. | B60D 1/02 |
| | | | 172/272 |
| 5,738,176 A | 4/1998 | Gingerich | |
| 6,478,094 B2 | 11/2002 | Alexander et al. | |
| 7,690,439 B2 | 4/2010 | Priepke et al. | |
| 7,748,548 B1 * | 7/2010 | Ragsdale, Sr. | B60D 1/01 |
| | | | 213/75 R |
| 7,850,190 B2 | 12/2010 | Ruckle et al. | |
| 8,770,612 B2 | 7/2014 | Wendte et al. | |
| 8,909,435 B2 | 12/2014 | Tuttle et al. | |
| 2006/0076755 A1 | 4/2006 | Bergeron | |
| 2017/0120705 A1 * | 5/2017 | Hruska | B60D 1/28 |
| 2018/0215216 A1 * | 8/2018 | Faust | B60D 1/363 |
| 2018/0304706 A1 * | 10/2018 | Hruska | B60D 1/02 |

OTHER PUBLICATIONS

Farm Show, Hydraulic Powered Hitch Pin, 2015, pp. 1-3.
Worksafe Victoria, Remote Drop Pin—G J Bennett and Sons, 2015, p. 1.

* cited by examiner

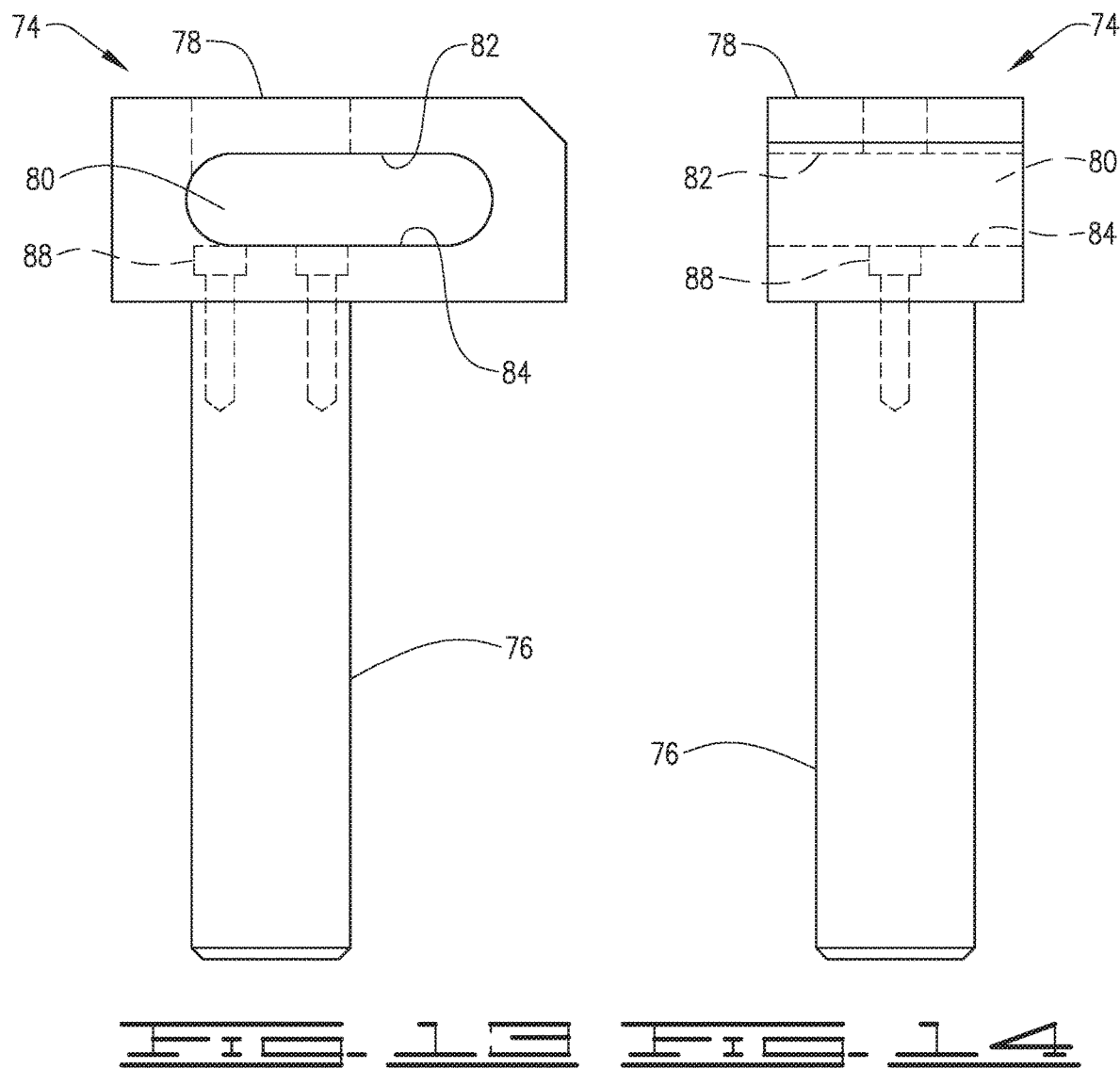
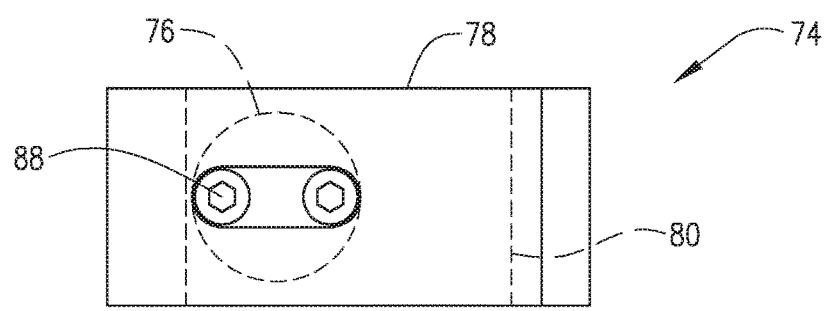
FIG. 13  FIG. 14
FIG. 15

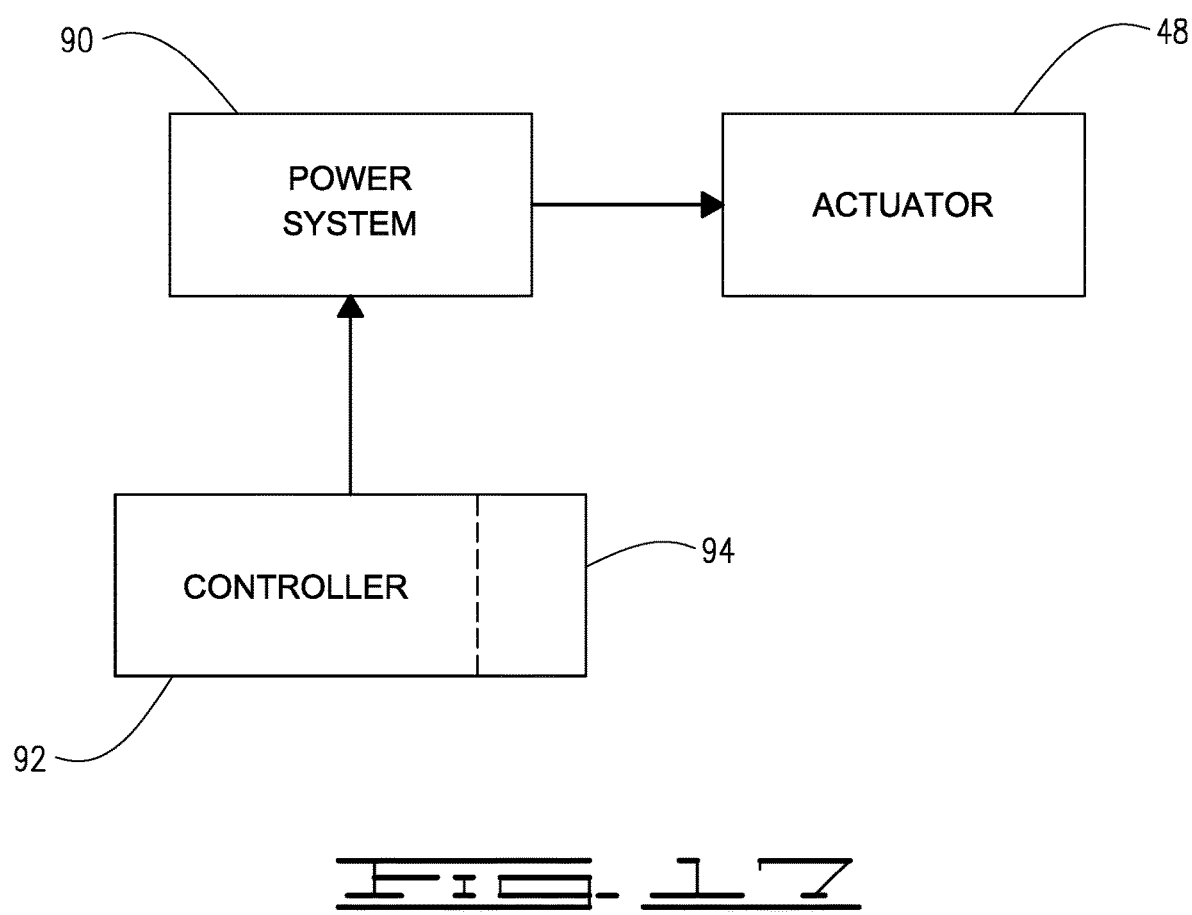

TRACTOR HITCH

CROSS-REFERENCE TO RELATED APPLICATION

This application claims the benefit of U.S. Provisional Application No. 62/545,761 filed Aug. 15, 2017, which is hereby incorporated by reference.

FIELD

The present disclosure relates generally to agricultural vehicles and, more particularly, to hitching systems that connect agricultural tractors and trailing implements that are towed behind tractors.

BACKGROUND

Agricultural tractors are used to tow trailing implements, such as ground working or harvesting implements through agricultural fields and such as bulk carriers through fields and on the road. The coupling of the towed equipment or trailing implements to the tractor and its uncoupling therefrom may require only the placement and removal of a hitch pin; however, hitching a trailing implement by hand can be problematic. In addition, to safety hazards involved in manually placing or removing a hitch pin, there is the inconvenience. Generally, such coupling is a two-man operation, or, in the alternative, requires the tractor operator to descend from his seat, effect the required coupling or uncoupling and then return to his seat for further operation of the tractor. The frequency of such operations can be quite high in any given work period, so that the time and effort involved may seriously effect work efficiency.

SUMMARY

Consistent with the present disclosure, a tractor hitch system is provided. The tractor hitch system utilizes an actuator, lever arm and pin. The pin is free floating so as to prevent binding or jamming when moving in and out of a latched or locked position with the drawbar of a tractor.

The trailer hitch in accordance with one series of embodiments of the current disclosure provides for automatically hitching or for remotely hitching a tractor to a trailing implement. The tractor hitch system comprises a base, an actuator, a pin and a lever arm. The base is configured to be mountable on a drawbar of the tractor. The actuator is movable between a first position and a second position. The lever arm is attached to the base. The lever arm is also connected to the actuator so that the actuator moving between the first position and the second position rotates the lever arm about a rotatable attachment with the base. Further, the lever arm is attached to the pin. The attachment of the lever arm to the pin allows the pin to pivot and move laterally with respect to the lever arm such that, when the actuator is in the first position, the pin engages the drawbar so as to be able to couple the tractor to the trailing implement, and when the actuator is in the second position, the pin is disengaged from the drawbar so that the tractor is not coupled to the trailing implement.

Embodiments of the tractor hitch system can further comprise a power system and a controller. The power system supplies electrical power to the actuator to power movement of the actuator between the first position and the second position. The controller for the power system includes a trigger operable to move the actuator between the first position and the second position.

In some embodiments, the actuator is telescoping so as to move between the first position and the second position, and wherein the first position is a retracted position and the second position is an extended position.

Additionally, some embodiments further comprise a fulcrum arm. The fulcrum arm is rotatably attached to the actuator and attached to the lever arm at the rotatable attachment to the base such that linear movement of the actuator is translated by the fulcrum arm to rotatable movement of the lever arm about the rotatable attachment. In such embodiments, the actuator can extend along the drawbar of the tractor.

Other embodiments do not have the fulcrum arm, and the lever arm can be rotatably attached to the base, rotatably attached to the actuator. In such embodiments, the base can include an actuator stand extending upward from the drawbar when the base is mounted on the drawbar.

In all these embodiments, the lever arm can be rotatably and slidably attached to the pin. The rotatable and slidable attachment to the pin allows the pin to pivot and move laterally with respect to the lever arm.

In the above embodiments, the base can be connected to a drawbar comprising an upper plate and lower plate. The upper and lower plates are parallel and spaced apart to form a gap between the upper plate and lower plate. The upper plate can have an upper aperture opposing a lower aperture on the lower plate. When the base is mounted on the drawbar, the pin is oriented with respect to the apertures such that, when the actuator is in the first position, the pin extends across the gap with a first portion of the pin lodged in the upper aperture and a second portion of the pin lodged in the lower aperture, and when the actuator is in the second position, the pin is lifted out of the lower aperture and does not extend into the gap.

In the above embodiments, the pin can have a flange and a rod projecting from the flange, wherein the rod engages the drawbar.

Embodiments of this disclosure also include a method for hitching a tractor to a trailing implement. The method comprises the steps of:

activating an actuator wherein the actuator moves between a first position and a second position;

rotating a lever arm about a lever arm about a rotatable attachment in response to moving the actuator between the first position and the second position; and moving a pin between a raised position and a lowered position in response to rotating the lever arm, wherein the lever arm is attached to the pin so as to allow the pin to pivot and move laterally with respect to the lever arm during the movement of the pin such that, when the actuator is in the first position, the pin engages a drawbar of a tractor so as to be able to couple the tractor to the trailing implement, and when the actuator is in the second position, the pin is disengaged from the drawbar so that the tractor is not coupled to the trailing implement.

The method can further comprise moving a fulcrum arm in response to moving the actuator between the first position and the second position, wherein linear movement of the actuator is translated by the fulcrum arm to rotatable movement of the lever arm about the rotatable attachment.

BRIEF DESCRIPTION OF THE DRAWINGS

The present invention is illustrated by way of example and not limited in the accompanying figures in which like reference numerals indicate similar elements and in which:

FIG. 13 is side view of a pin suitable for free-floating attachment in the embodiments of this disclosure.

FIG. 14 is a front view of the pin of FIG. 13.

FIG. 16 is an exploded view of the pin of FIG. 13.

FIG. 17 is a schematic diagram of the relationship of the actuator, power system and controller in accordance with certain embodiments.

DETAILED DESCRIPTION

Figure 1:
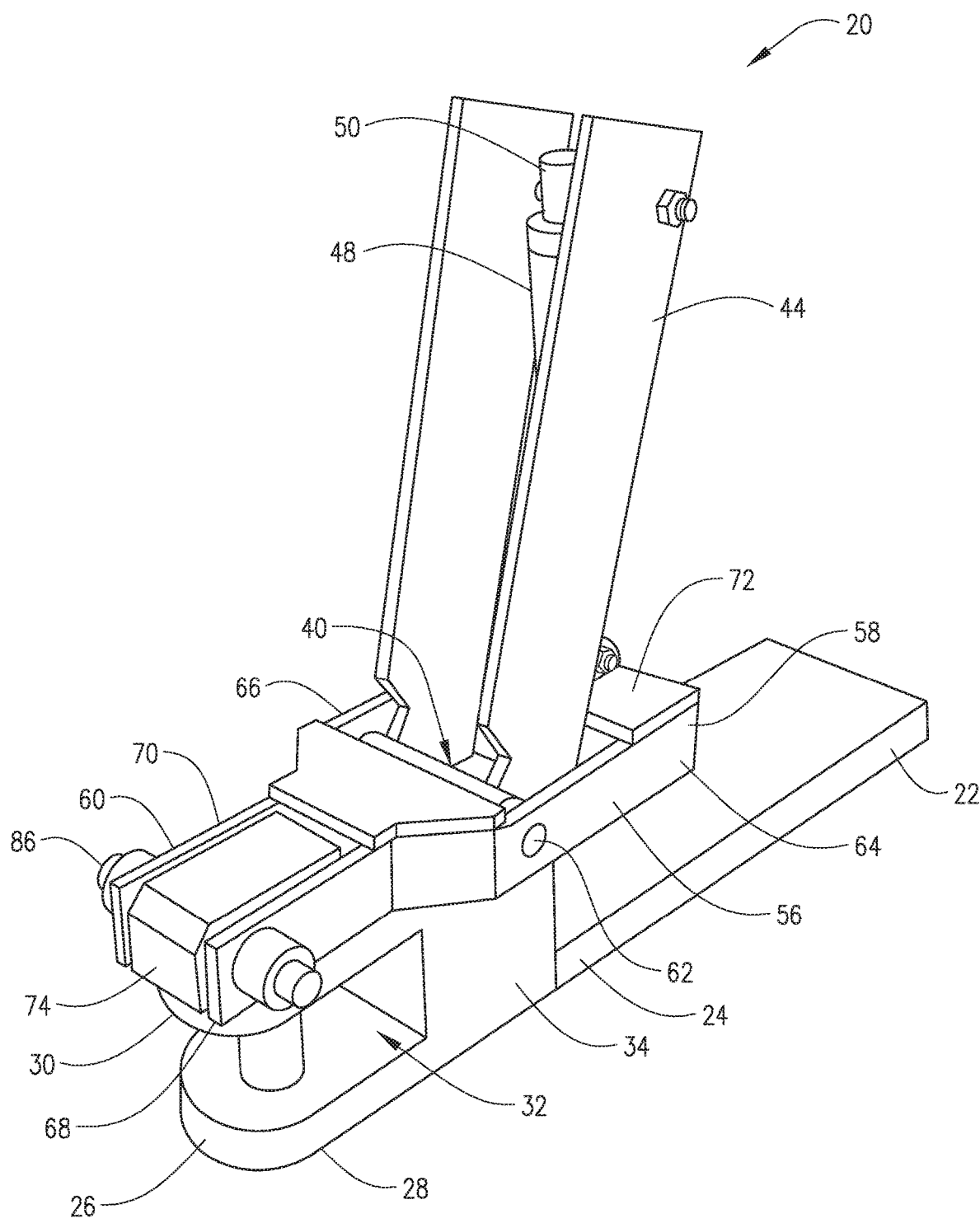
FIG. 1 is a front perspective view of a tractor hitch system in accordance with one embodiment. The hitch system is shown in the latched or locked position; that is, the pin engaged with a drawbar to prevent release of a trailing implement.

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

In the description that follows, like parts are marked throughout the specification and drawings with the same reference numerals, respectively. The drawings are not necessarily to scale and the proportions of certain parts have been exaggerated to better illustrate details and features of the invention. Where components of relatively well-known designs are employed, their structure and operation will not be described in detail.

Turning now to FIGS. 1-6, there is illustrated an embodiment of a tractor hitch system 20 for hitching a tractor to a trailing implement, which can be automatic or performed remotely. The tractor hitch system 20 is shown mounted on a drawbar 22. The drawbar comprises a drawbar arm 24, which generally is attached to a tractor (not shown) in a manner known in the art. A first end 26 of drawbar arm 24 comprises a lower plate 28 and an upper plate 30. Lower plate 28 and upper plate 30 are parallel and spaced apart to form a gap 32 between lower plate 28 and upper plate 30. As shown, lower plate 28 is part of or an extension of drawbar arm 24 and upper plate 30 is attached to drawbar arm 24 by mount 34. Hitch system 20 is readily adaptable to other drawbar arrangements as will be apparent to those skilled in the art based on this disclosure.

Lower plate 28 has an aperture 36, sometimes referred to herein as lower aperture 36. Upper plate has an aperture 38, sometimes referred to herein as upper aperture 38. Lower aperture 36 and upper aperture 38 oppose each other such that they face each other in alignment across gap 32.

Hitch system 20 comprises a base 40, which is configured to be mountable on drawbar 22. As illustrated in the figures, base 40 is mounted and attached to mount 34 of drawbar 22. Generally, base 40 should be securely mounted onto mount 34, which can be by bolts, welding or other similar attachment methods capable of keeping base 40 secure on drawbar 22 during actuation of hitch system 20 as further described below.

In the embodiment of FIGS. 1-6, base 40 will include a base plate 42 and an actuator stand 44. As shown, base plate 42 is attached to mount 34 of drawbar 22 and extends horizontally. Actuator stand 44 extends upward from base plate 42. Typically, actuator stand 44 can extend upwards from 0 degrees to 30 degrees from vertical axis 46 (the axis perpendicular to base plate 42). More typically, actuator stand 44 is not quite vertical but at an angle of about 5 degrees to 20 degrees from vertical axis 46. As will be realized, actuator stand 44 extends upward from base plate 42 such that it extends upward from drawbar 22 when base plate 42 is mounted on drawbar 22.

Hitch system 20 further comprises an actuator 48 and lever arm 56. Actuator 48 is configured to move lever arm 56. As illustrated, a first end 50 of actuator 48 is attached to actuator stand 44 of base 40. This attachment is a pivotal or rotating connection so as to allow actuator 48 to pivot as necessary during its movement between a first position and second position. Similarly, a second end 52 of actuator 48 is connected to a first end 58 of lever arm 56 by a pivotal or rotating connection. Lever arm 56 is attached to pin 74 at a second end 60. Further, lever arm 56 is attached to base 40 at a mid-position 62 between first end 58 and second end 60. The attachment at mid-position 62 is a pivotal or rotating connection. Thus, as actuator 48 moves between a first position (illustrated in FIG. 1) and a second position (illustrated in FIG. 2), lever arm 56 is pivoted or rotated about the attachment at mid-position 62. While the embodiment shown utilizes an attachment between lever arm 56 and base 40 located at a mid-position 62 of the lever arm, other configurations are possible. For example, lever arm 56 can be attached to base 40 at first end 58 of lever arm 56, and second end 52 of actuator 48 can be attached to lever arm 56 at mid-position 62.

As will be appreciated, actuator 48 can be any suitable actuator that can pivot lever arm 56 about its attachment to base 40 by movement between a first position and a second position. In the illustrated embodiments, actuator 48 is telescoping so as to move between the first position and the second position, and wherein the first position is a retracted position (illustrated in FIGS. 1, 2 and 5) and the second position is an extended position (illustrated in FIGS. 3, 4 and 6). Thus, actuator 48 can include telescoping segments 54, which are slidingly engaged with each other such that one slides into the other, such as by volumetric or screw means. For example, the actuator can be tube and piston type in which the piston slides in relation to the actuator by hydraulic, pneumatic or electrical power. However, generally hydraulic and pneumatic power on tractors are limited, and they need to be reserved for operating the trailing implements. Advantageously, the current embodiments are well suited for using electrically powered actuators, such as can be powered by a 12-volt battery. Currently, linear electric actuators are preferred.

In the illustrated embodiment, lever arm 56 has a wishbone configuration comprising two sets of opposing arms with one set being wider or spaced further apart than the other set. As best seen from FIGS. 1 and 4, at first end 58, lever arm 56 has a first arm 64 opposing second arm 66 such that the arms are parallel, and at second end 60, lever arm 56 has a third arm 68 opposing fourth arm 70 such that the arms are parallel. First arm 64 and second arm 66 are spaced apart as are third arm 68 and fourth arm 70; however, the spacing is greater for first arm 64 and second arm 66 than it is for third arm 68 and fourth arm 70. The spacing of first arm 64 and second arm 66 allows the pair of arms to extend to each side of actuator stand 44; thus, actuator stand 44 is in between first arm 64 and second arm 66. Further, a pedal 72 can extend from first arm 64 to second arm 66 and serve as an attachment point for actuator 48.

Additionally, pin 74 is rotatably and slidably attached to second end 60 of lever arm 56 such that the attachment allows pin 74 to pivot and move laterally with respect to the lever arm. As illustrated in FIGS. 13-16, pin 74 has a rod section 76 and a flange section 78. Flange section 78 has a slot 80 extending from a first side 82 to a second side 84. Slot 80 is an elongated slot so as to allow lateral movement relative to a bolt or rolling pin 86 extending through slot 80 (FIG. 1-6). Accordingly, when lever arm 56 has a wishbone configuration (described above), flange 78 of pin 74 can be positioned between third arm 68 and fourth arm 70 of lever arm 56. Rolling pin 86 can extend though an aperture in third arm 68, through slot 80 and through an aperture in fourth arm 70 such that pin 74 engages the bolt in a rotatable and slidable manner so as to allow lateral and pivotal movement of pin 74. Thus, pin 74 is a "free floating" pin allowing movement relative to lever arm 56 and to drawbar 22. As illustrated, rod section 76 is mounted to flange section 78 using bolts 88; however, rod section 76 can be attached by other suitable means such as welding, for example.

Among other differences, prior art systems have relied on a "stationary pin", which cannot move relative to a pin mount or to the drawbar and more specifically cannot pivot or move laterally with respect to the pin mount. Such prior art systems required vertically lowering the pin directly down into the apertures on the drawbar. Accordingly, the ring or aperture on the towing tongue of the trailing implement had to be directly aligned with the apertures on the drawbar, and the pin had to be directly aligned with the apertures on the drawbar and the aperture on the towing tongue. However, such direct alignment was difficult to achieve and often required several attempts and readjustments to achieve correct alignment and hitching of the trailing implement to the tractor. Further, during towing of the trailing implement the alignment could shift and bind or wedge the pin in the drawbar apertures; thus, when the trailing implement was to be unhitched, the pin would not readily withdraw from the drawbar apertures. Thus, the operator's safety would be placed at risk because he was then required to place himself between the tractor and the trailing implement trying to work loose the pin. Advantageously, the current hitch system uses a floating pin that can adjust in position so to readily drop into the drawbar apertures and the tongue aperture even when there is no direct alignment, such as when the apertures are slightly askew. Further, the floating pin prevents the binding or wedging of the pin such that the operator can remove the pin remotely without manual manipulation.

Turning now to FIG. 17, embodiments of the tractor hitch system—such as system 20 and system 100 discussed below—can further comprise a power system 90 and a controller 92. The power system supplies power to the actuator to power movement of the actuator between the first position and second position. As indicated above, while the power system can be hydraulic or pneumatic, it is advantageous that the hitch system 20 can operate based on electrical power, such as power system 90 being a 12-volt battery. Operation by electrical power offers numerous advantages, including ease of operation and avoiding reducing the hydraulic or pneumatic power available for operating the trailing implement.

The controller 92 can include a trigger 94 and controls the power provided to hitch system 20. By operating trigger 94, the operator can power the actuator to move between the first position and the second position.

Figure 3:
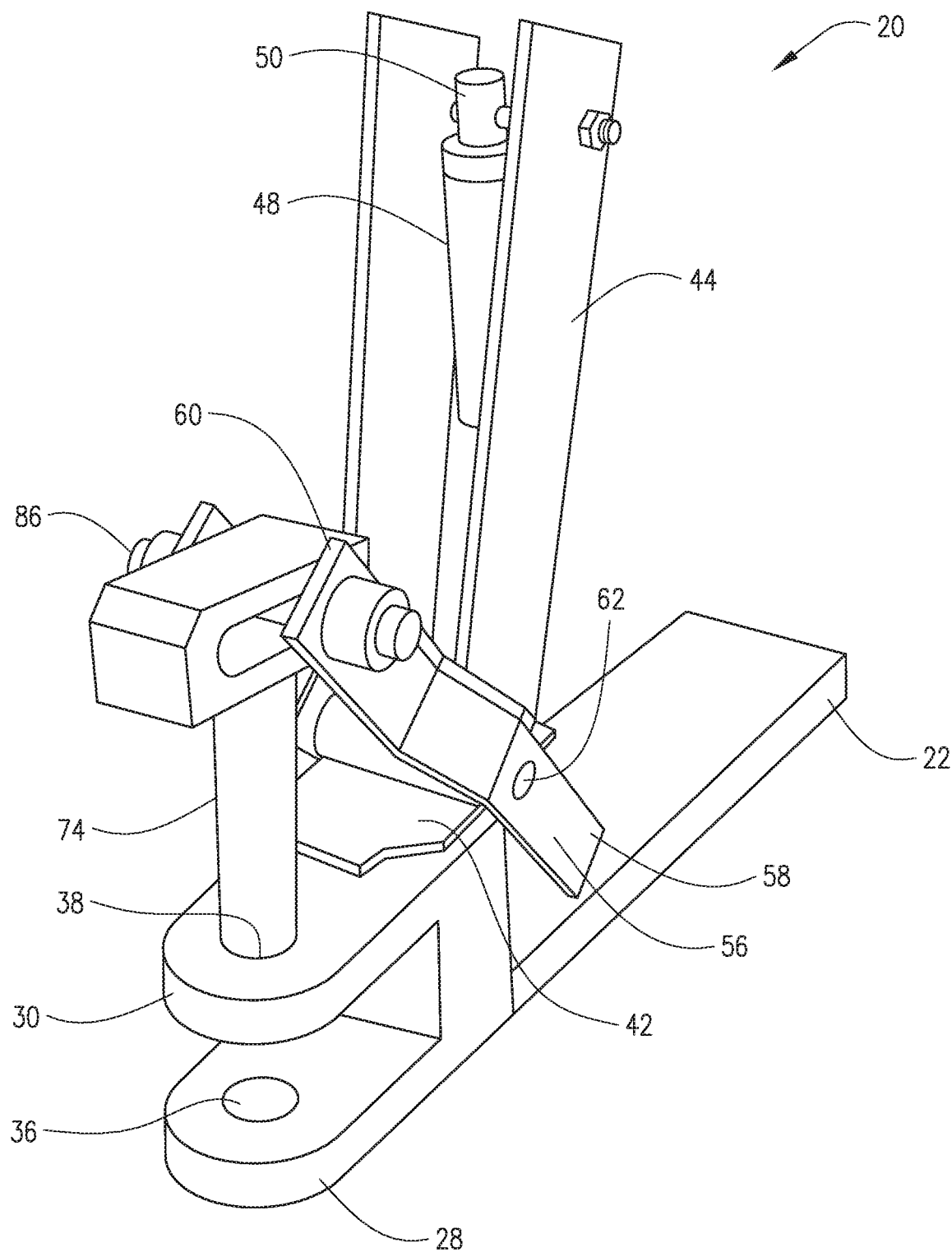
FIG. 3 is a front perspective view of the tractor hitch system of FIG. 1 in the unlatched or unlocked position; that is, the pin is disengaged with the drawbar so as to allow release of a trailing implement.
Figure 4:
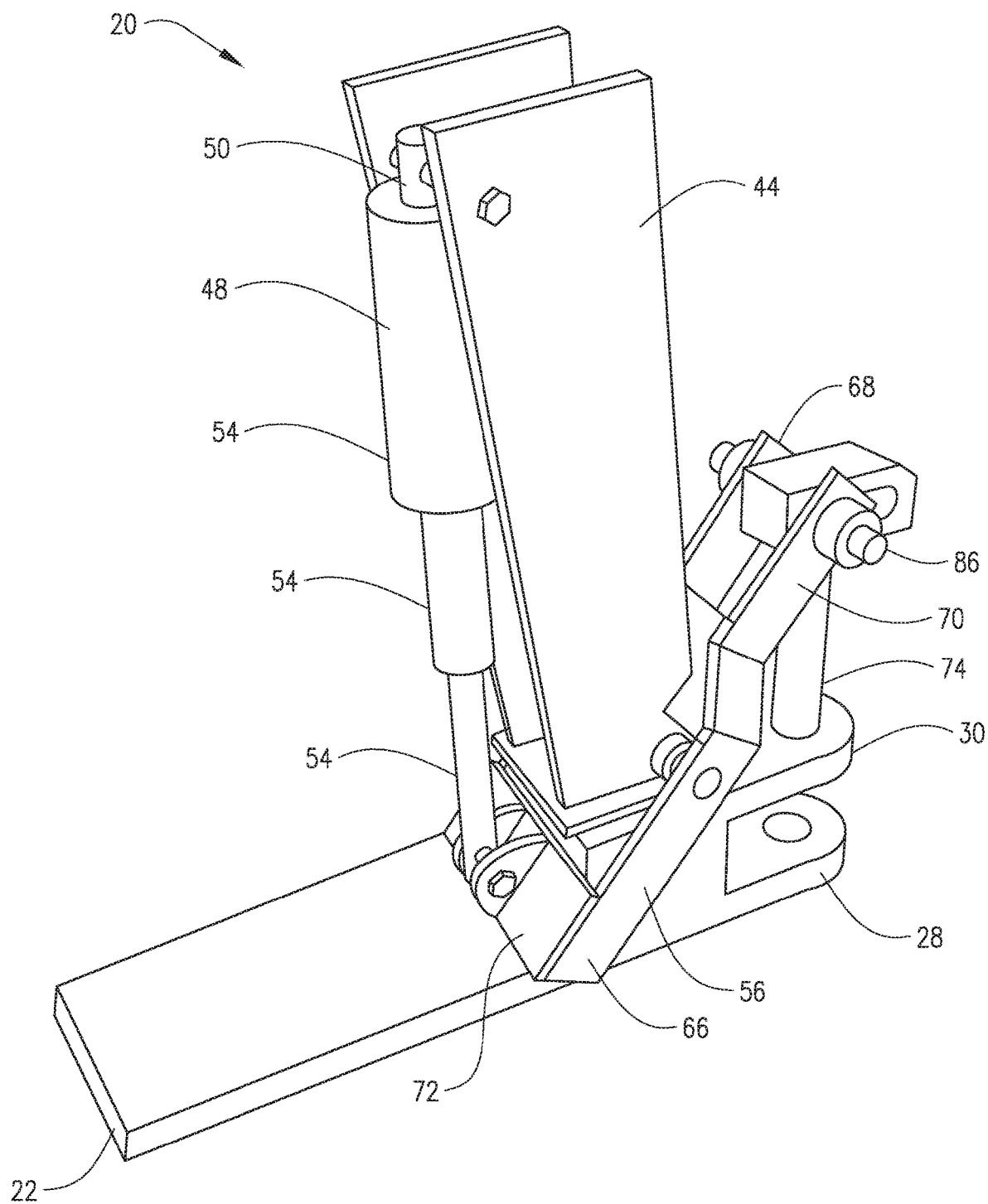
FIG. 4 is a rear perspective view of the tractor hitch system of FIG. 1 in the unlatched position.
Figure 6:
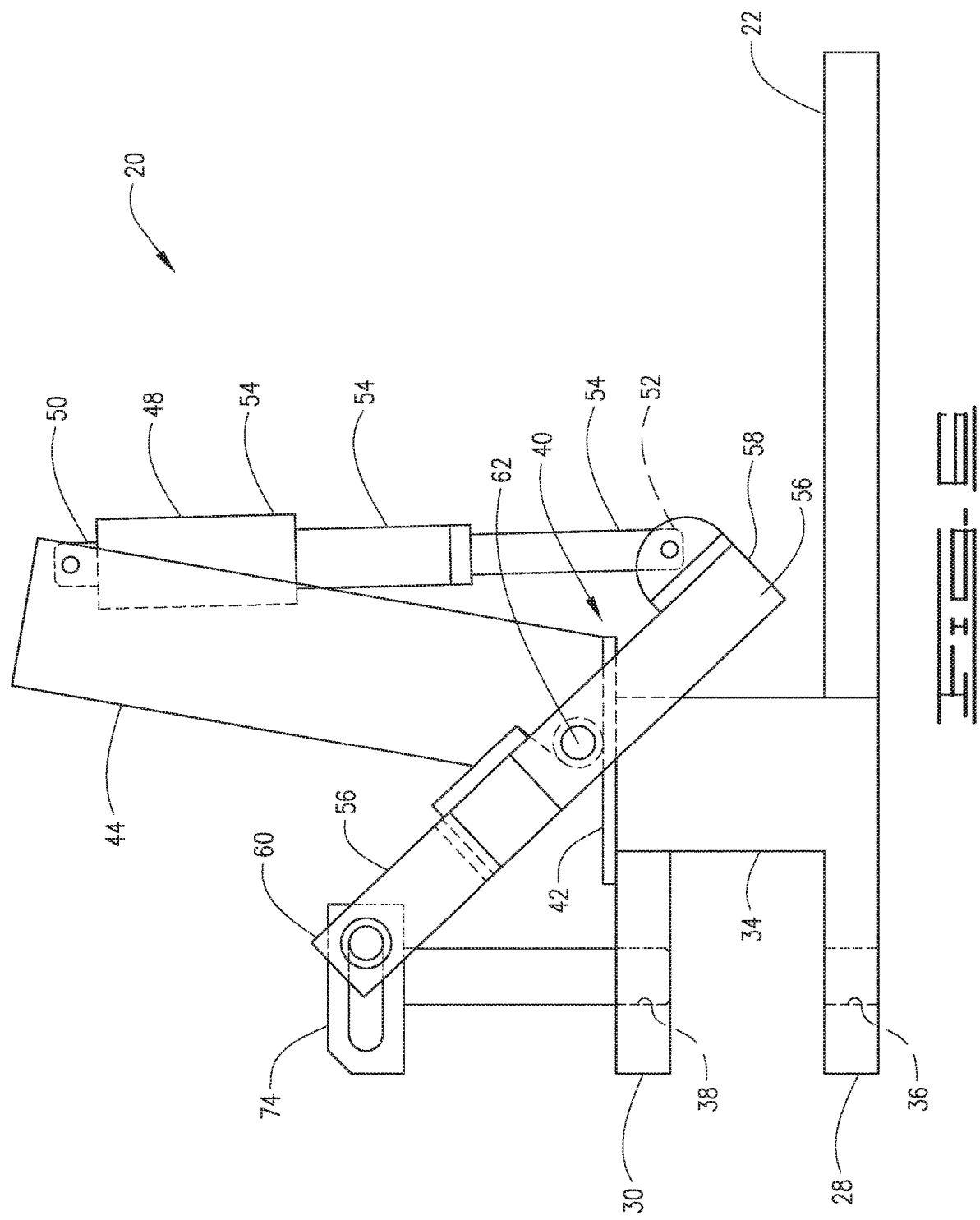
FIG. 6 is a side view of the tractor hitch system of FIG. 1 in the unlatched position.
Figure 7:
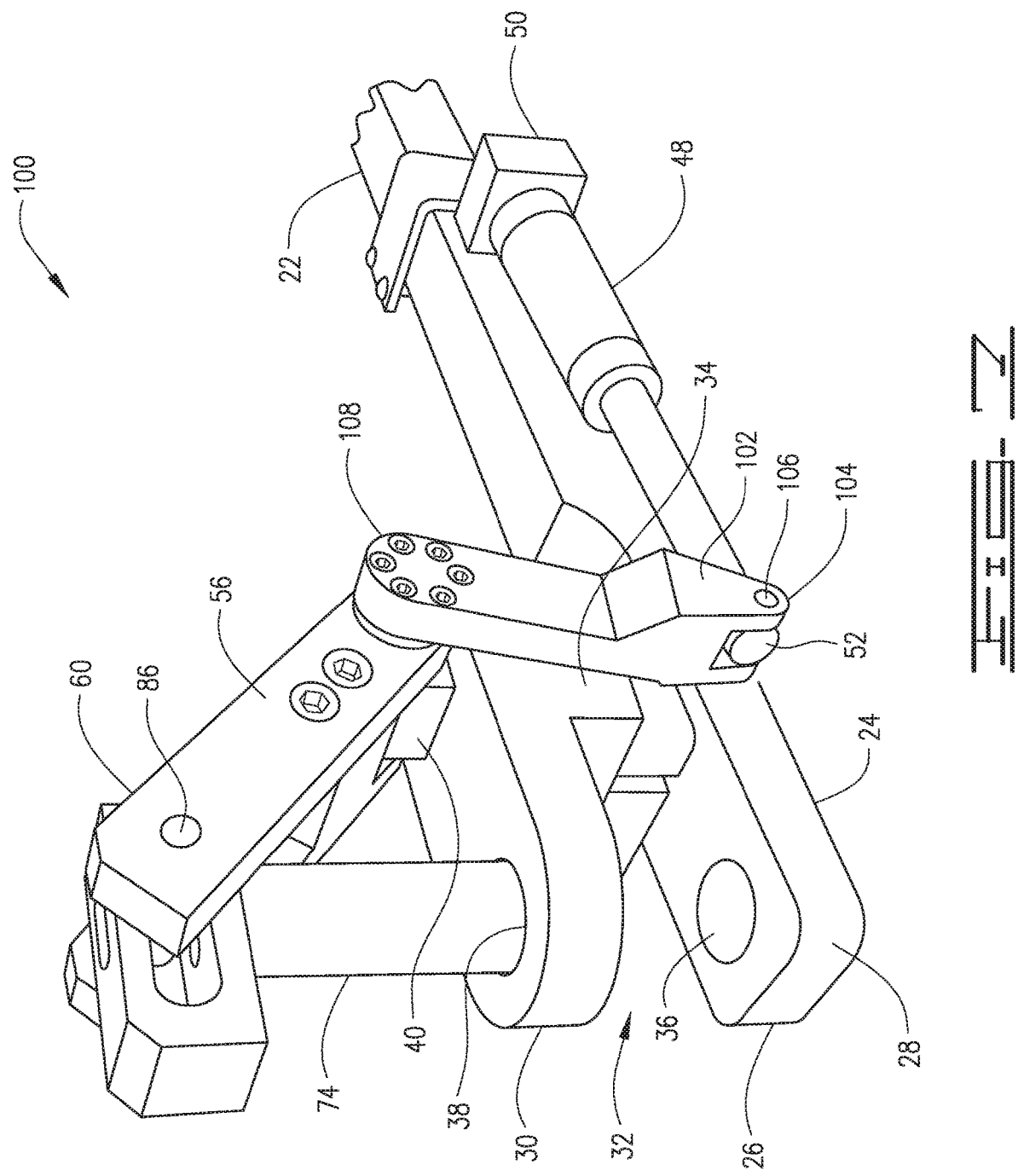
FIG. 7 is a front perspective view of a trailer hitch system in accordance with a second embodiment. The hitch system is shown in the unlatched or unlocked position.
Figure 8:
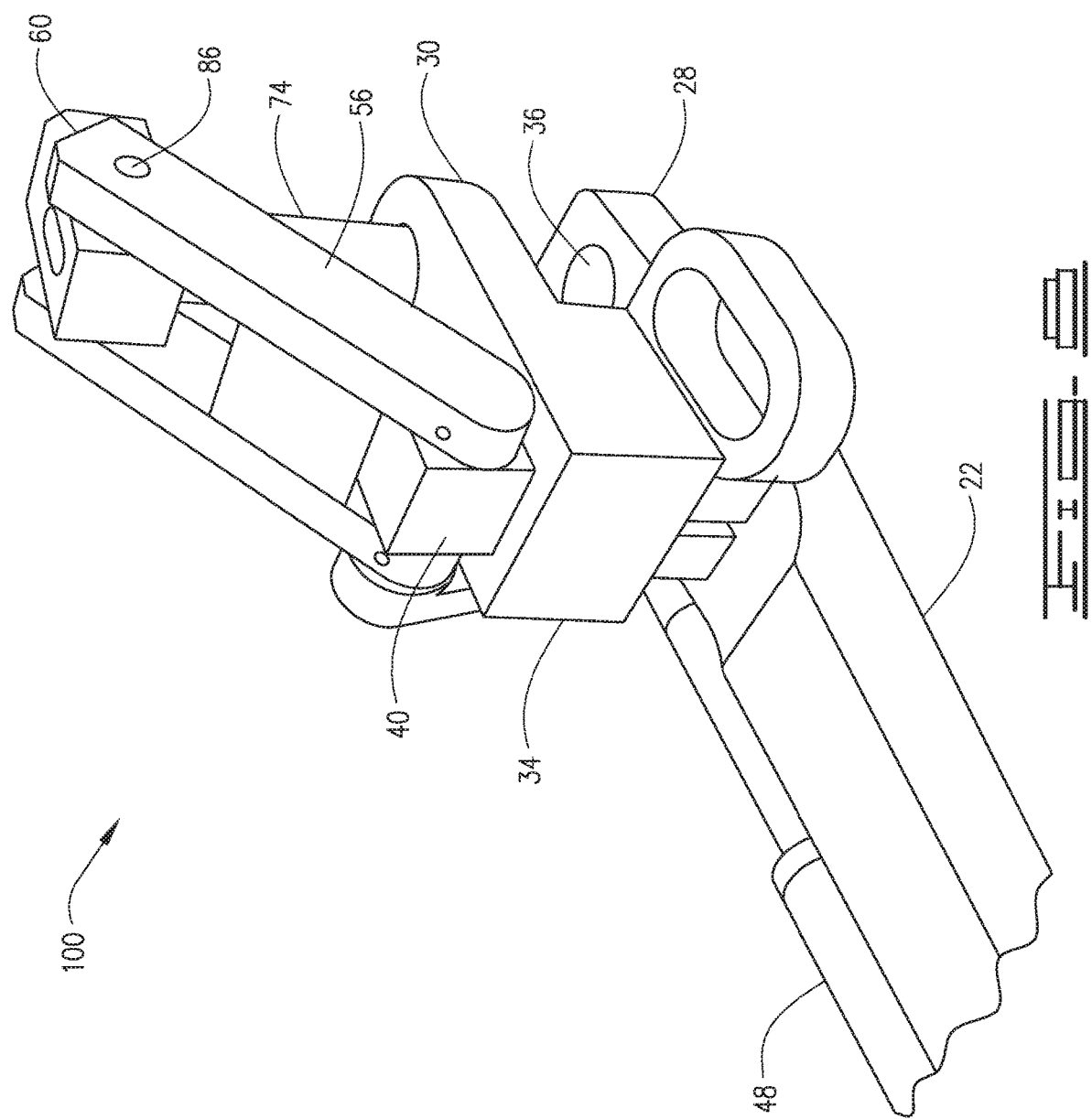
FIG. 8 is a rear perspective view of the trailer hitch system of FIG. 7 in the unlatched position.
Figure 9:
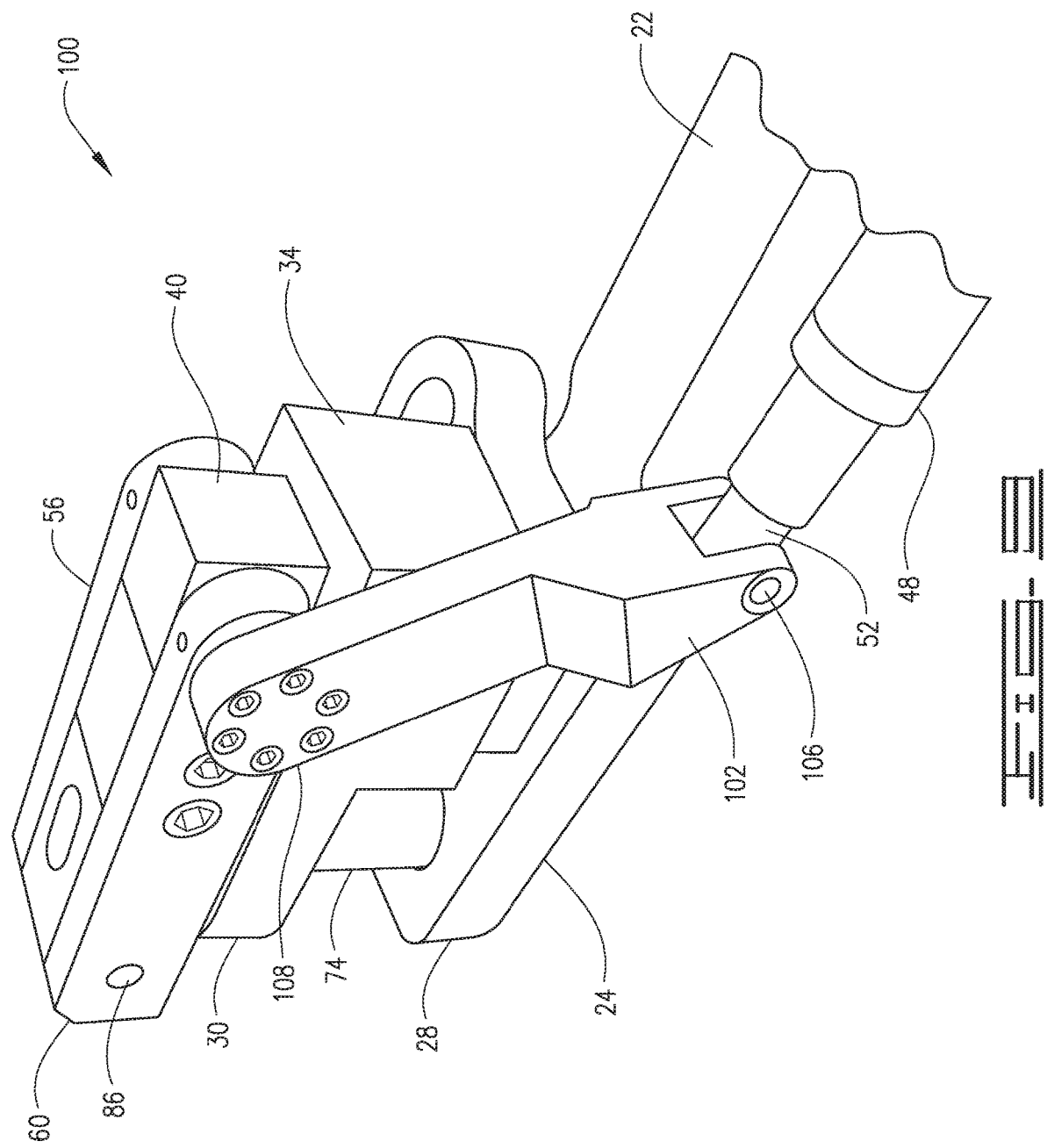
FIG. 9 is a rear perspective view of the tractor hitch system of FIG. 7 in the latched position.
Figure 10:
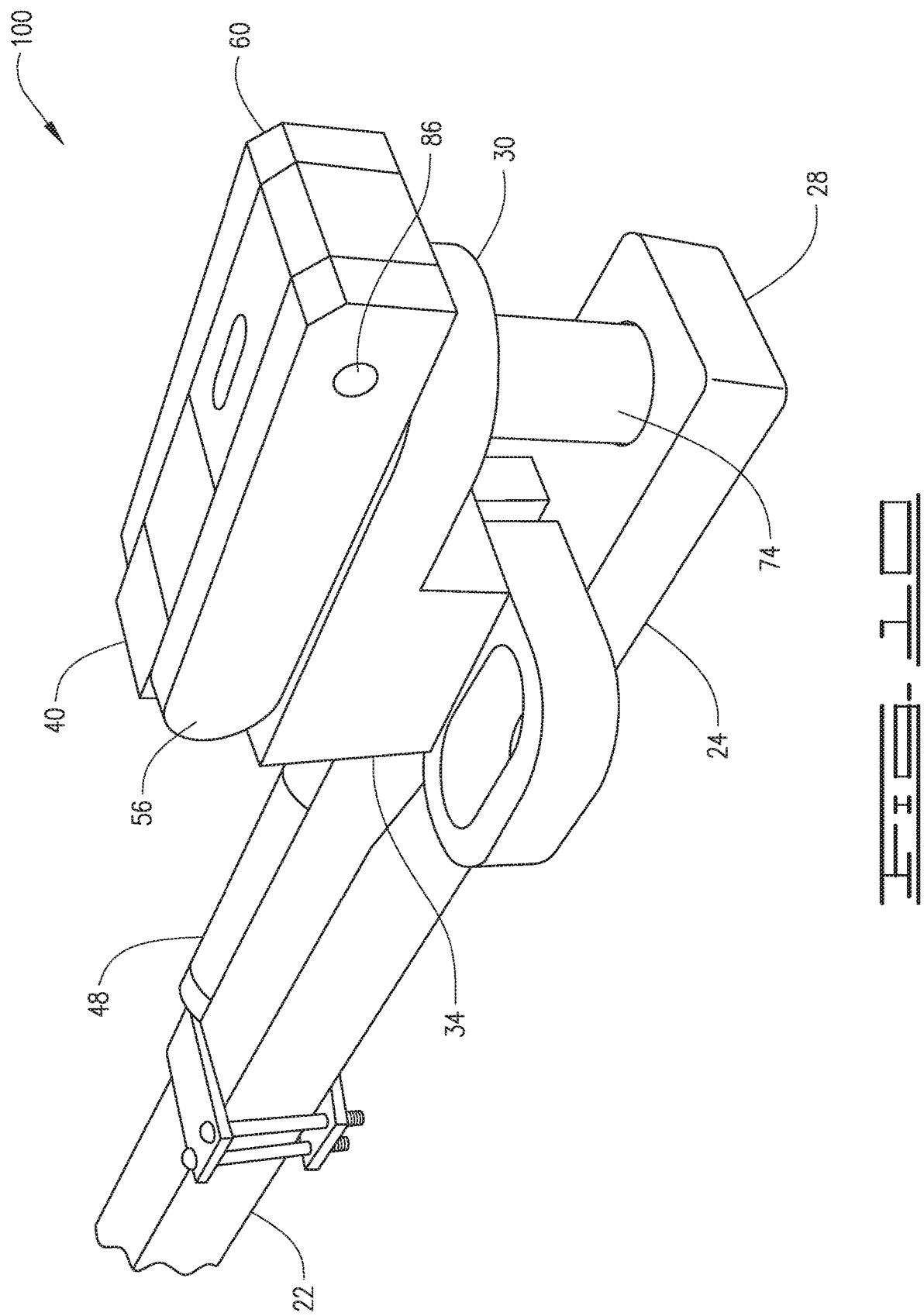
FIG. 10 is a front perspective view of the tractor hitch system of FIG. 7 in the latched position.
Figure 11:
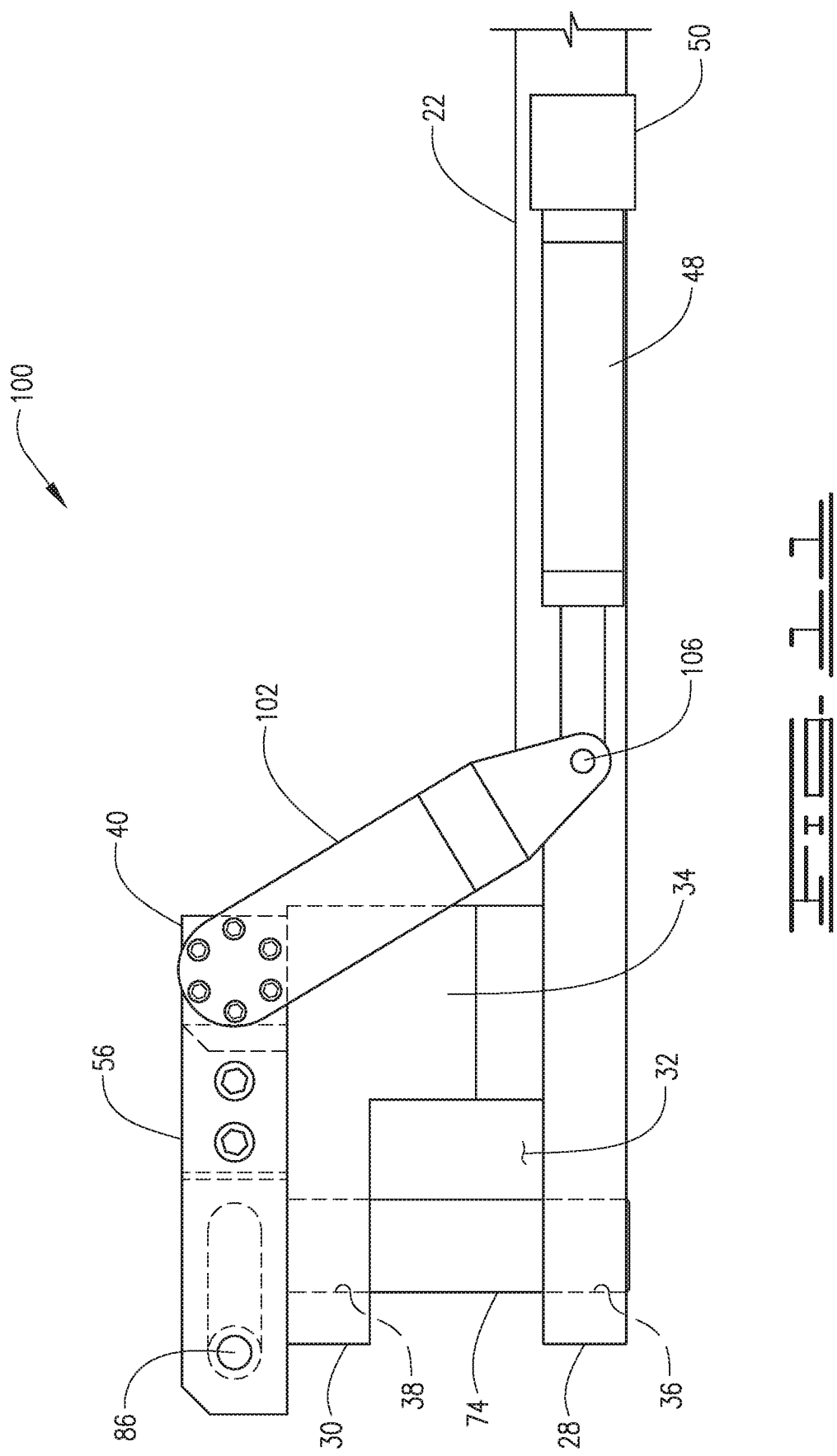
FIG. 11 is a side view of the tractor hitch system of FIG. 7 in the latched position.
Figure 12:
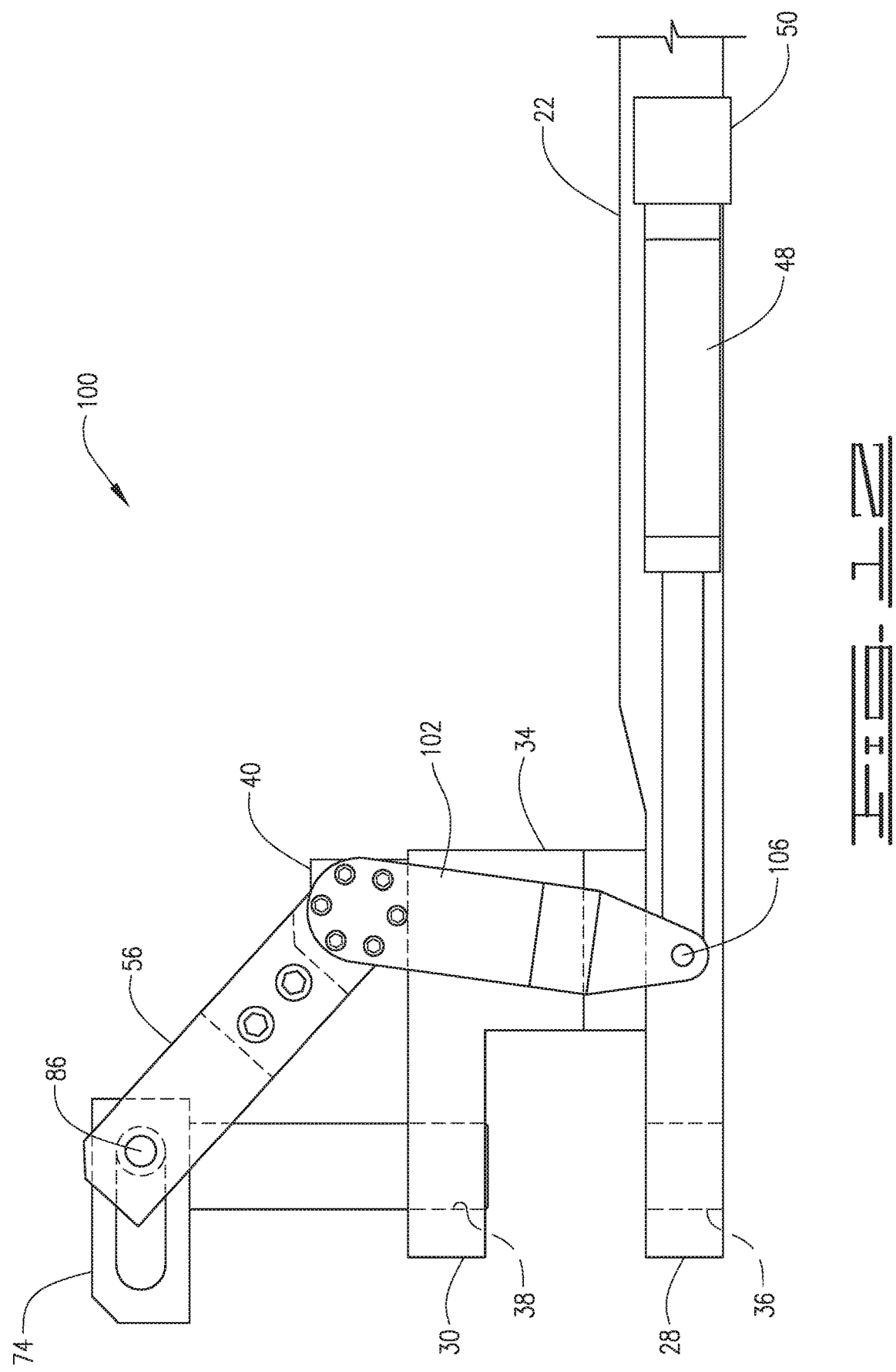
FIG. 12 is a side view of the tractor hitch system of FIG. 7 in the unlatched position.
Figure 15:
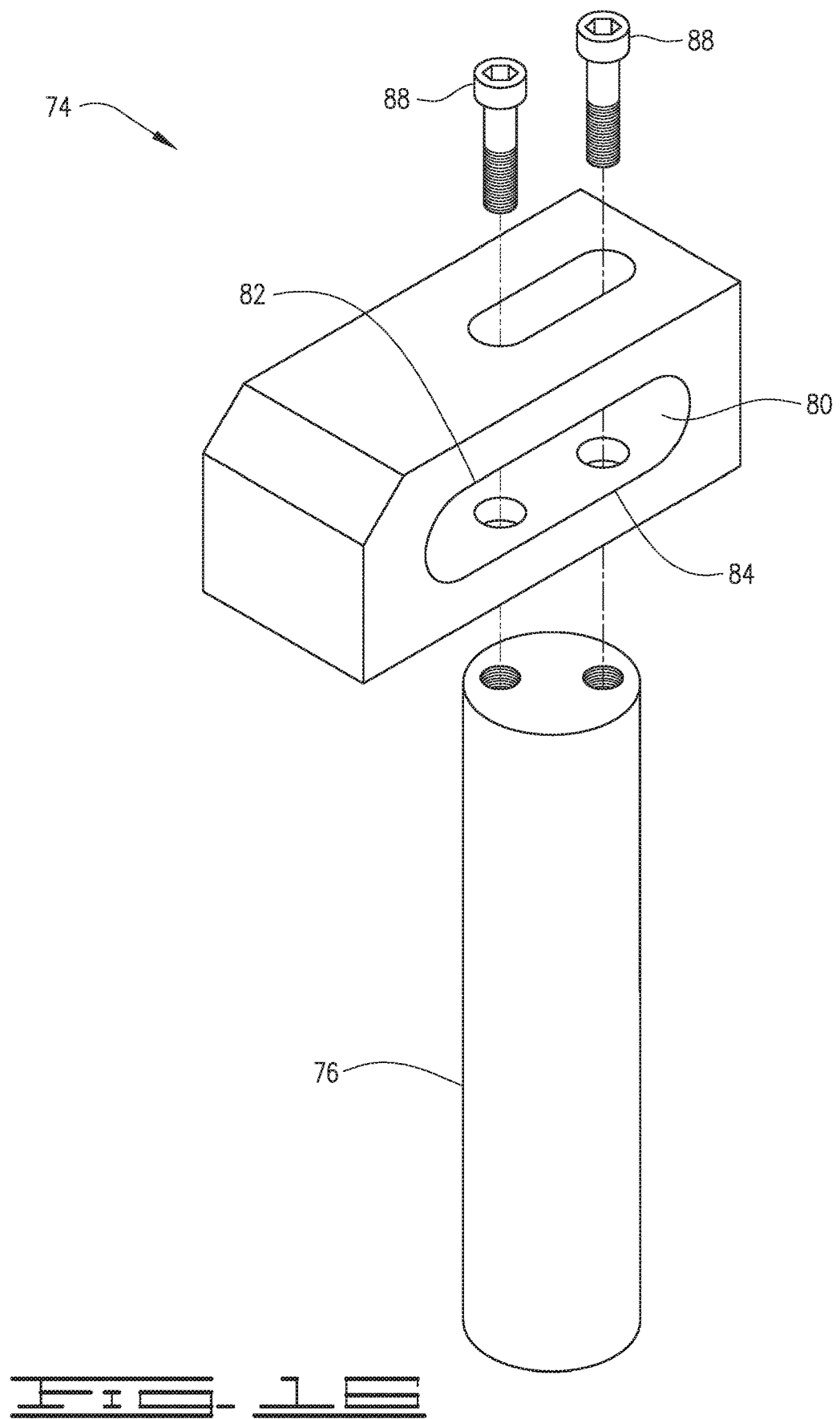
FIG. 15 is a top view of the pin of FIG. 13.

In operation, the hitch system can be placed in the second position such that pin 74 is withdrawn from at least lower aperture 36 and gap 32 of the drawbar, as illustrated in FIG. 10. This position is the unlatched or unlocked position. As shown in FIGS. 3, 4 and 6, the telescoping actuator 48 is in its extended position, which places lever arm 56 at an angle to horizontal such that first end 58 is lower than second end 60 thus pin 74 is raised so as to be withdrawn from at least lower aperture 36 and gap 32 of the drawbar. The tractor and trailing implement can then be positioned such that a portion of the tongue of the trailing implement is positioned within gap 32. The portion of the tongue has an aperture, which is positioned such that the aperture is aligned with lower aperture 36 and upper aperture 38 of drawbar 22. While direct alignment of the tongue aperture with lower aperture 36 and upper aperture 38 is desirable, the hitch can operate with the alignment being slightly off, as indicated above.

Figure 2:
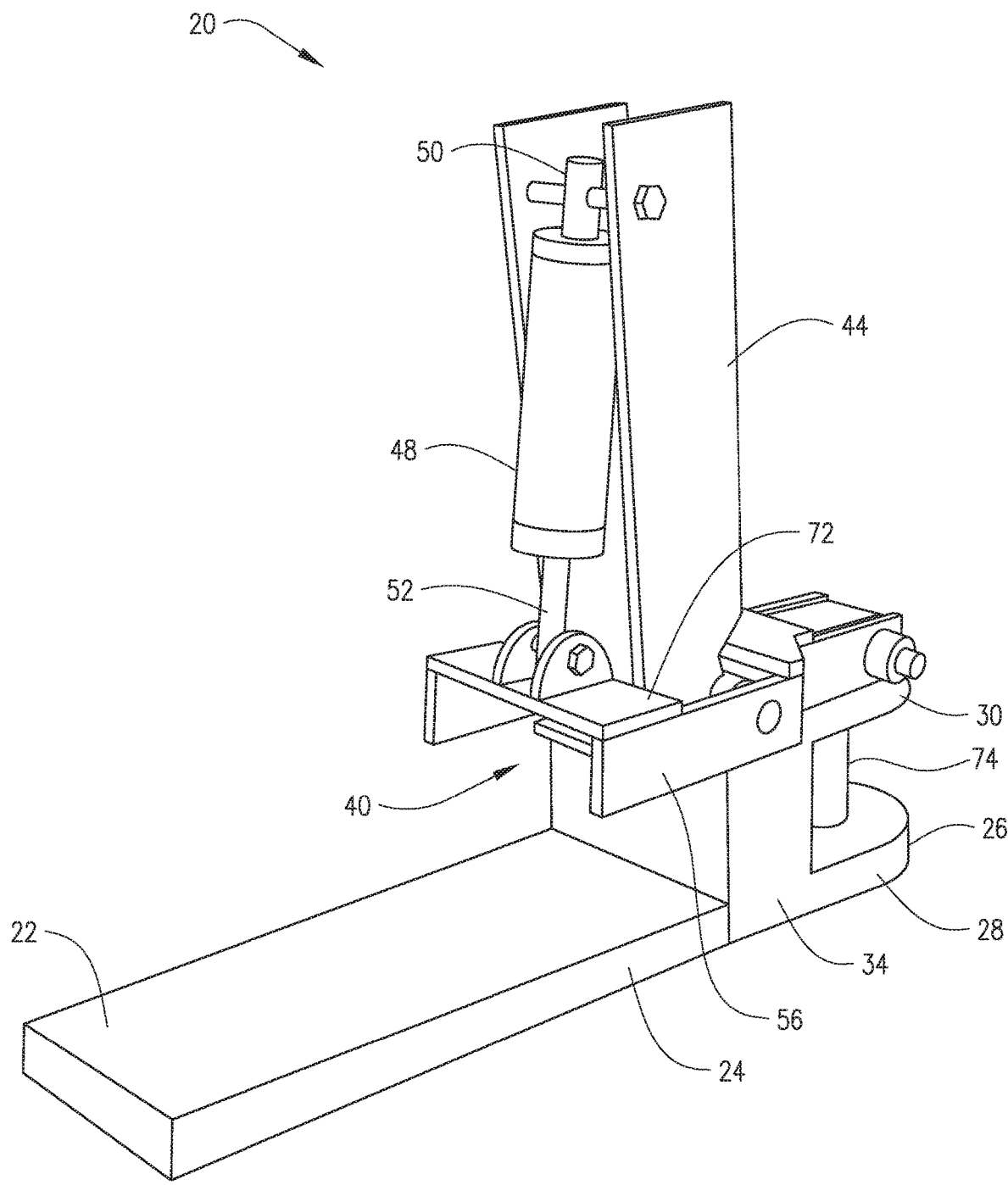
FIG. 2 is a rear perspective view of the tractor hitch system of FIG. 1 in the latched position.
Figure 5:
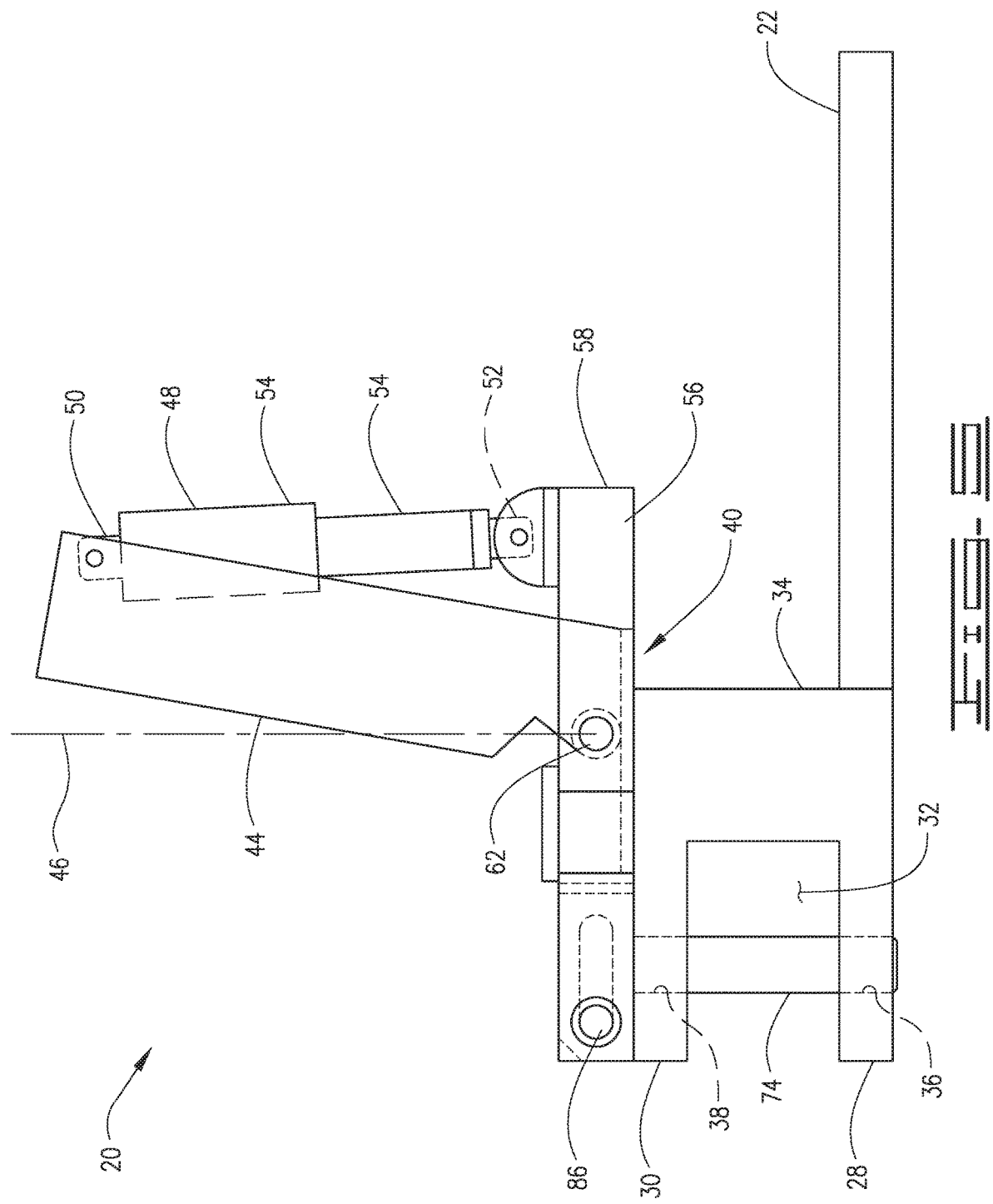
FIG. 5 is a side view of the tractor hitch system of FIG. 1 in the latched position.

Next, the operator toggles the controller trigger 94 to activate actuator 48 to move to the first position (shown in FIGS. 1, 2 and 5). In moving to the first position, actuator 48 retracts thus moving first end 58 of lever arm 56 upwards. Lever arm 56 pivots around mid-position 62 thus, as first end 58 moves upward, second end 60 moves downward and lowers pin 74. Because pin 74 is free floating, it self-aligns with upper aperture 38, lower aperture 36 and the tongue aperture of the trailing implement (tongue and trailing implement are not shown in the figures). Accordingly, pin 74 is lowered so as to extend across gap 32 with a first portion of pin 74 lodged in upper aperture 38, a second portion of pin 74 lodged in lower aperture 36 and a mid-portion of pin 74 lodged in the tongue aperture. When hitch system 20 is in the first position, pin 74 is held in place by lever arm 56, which is shown as being in a horizontal position or parallel to the drawbar. Lever arm 56 in turn is held in position by actuator 48. Thus, pin 74 is held in place without aid of a safety pin or similar locking mechanism and cannot work its way out of place. This position of pin 74 is the latched or locked position.

When the operator desires to unhitch the trailing implement from the tractor, the operator toggles the controller switch to activate actuator 48 to move to the second position (shown in FIG. 10). In moving to the second position, actuator 48 extends thus moving first end 58 of lever arm 56 downwards. Lever arm 56 pivots around mid-position 62 thus, as first end 58 moves downward, second end 60 moves upward and raises pin 74. Because pin 74 is free floating, it self-aligns with upper aperture 38, lower aperture 36 and the tongue aperture of the trailing implement thus preventing binding or wedging of the pin, which might prevent pin removal by the hitch system. Accordingly, pin 74 raises until it is at least withdrawn from at least lower aperture 36, gap 32 of the drawbar and the tongue aperture of the trailing implement. Once pin 74 is raised, the tractor and/or trailing implement can be removed so that the tongue of the trailing implement is no longer within gap 32.

Turning now to FIGS. 7-12, there is illustrated a tractor hitch system 100 in accordance with a second embodiment, wherein the hitching can be automatic or performed remotely. The tractor hitch system 100 is shown mounted on a drawbar 22. The drawbar is generally the same as described above for the embodiment of FIGS. 1-6. However, hitch system 100 is readily adaptable to other drawbar arrangements as will be apparent to those skilled in the art based on this disclosure.

Hitch system 100 comprises a base 40, which is configured to be mountable on drawbar 22. As illustrated in the figures, base 40 is mounted and attached to mount 34 of drawbar 22. Generally, base 40 should be securely mounted onto mount 34, which can be by bolts, welding or other similar attachment methods capable of keeping base 40 secure on drawbar 22 during actuation of hitch system 20 as further described below.

In this embodiment, base 40 does not include a base plate 42 and an actuator stand 44; rather base 40 serves as an axle attachment for lever arm 56. Base 40, for example, can have an axle (not shown) extending therethrough with lever arm 56 connected thereto such that lever arm 56 can pivot or rotate about base 40.

Hitch system 100 further comprises an actuator 48 attached at a first end 50 to draw bar 22 so as to keep actuator 48 locked in place and co-aligned with drawbar 22. A fulcrum arm 102 is pivotally attached at a first end 104 to second end 52 of actuator 48 so that as actuator 48 telescopes out to its extended position, fulcrum arm 102 pivots about pivot point 106. At a second end 108, fulcrum arm 102 is attached to lever arm 56 at its pivotal connection to base 20. Thus, as fulcrum arm 102 pivots about pivot point 106, it causes lever arm 56 to pivot about the pivotal connection with base 40, and hence raises second end 60 of lever arm 56. In this manner, fulcrum arm 102 translates linear movement of actuator 48 into rotatable movement of lever arm 56 about the pivotal connection to base 20.

As will be realized from the disclosure above, lever arm 56 is connected to pin 74, thus raising second end 60 of lever arm 56 raises pin 74 so that it moves out of aperture 36 and out of gap 32. Conversely, lowering lever arm 56 will lower pin 74. Because pin 74 is free floating, it will pass through gap 32 and position itself into aperture 36. Additionally, the free floating configuration of pin 74 prevents binding or jamming of the pin so that it can readily move in and out of aperture 36 and gap 32 even when the tongue of a trailing implement is slightly out of alignment with drawbar 22 such that the apertures of the tongue are not concentric with the apertures of the drawbar but slightly askew.

As for system 20, actuator 48 can be any suitable actuator that can pivot fulcrum arm 102 by movement between a first position and a second position. For example, actuator 48 can be telescoping. However, linear electric actuators are currently preferred. In the system 100, lever arm 56 has a wishbone configuration similar to that described above for system 20. Additionally, pin 74 is rotatably and slidably attached to second end 60 of lever arm 56 such that the attachment allows pin 74 to pivot and move laterally with respect to the lever arm.

Although certain preferred embodiments of the invention have been herein described in order to illustrate the principles of the invention, it will be understood that various changes and innovations in structure can be effected without departure from these principles. Changes and innovations of this type are therefore deemed to be circumscribed by the spirit and scope of the invention except as the same may be limited by the appended claims or reasonable equivalents thereof.

What is claimed is:

1. A tractor hitch system for hitching a tractor to a trailing implement, comprising:
    a base configured to be mountable on a drawbar of the tractor;
    an actuator movable between a first position and a second position;
    a pin; and
    a lever arm rotatably attached to the base, connected to the actuator so that the actuator moving between the first position and the second position rotates the lever arm about a rotatable attachment with the base, and attached to the pin so that a resulting rotational movement of the lever arm moves the pin between a raised position and lowered position, wherein the lever arm is attached to the pin so as to allow the pin to pivot and move laterally with respect to the lever arm such that, when the actuator is in the first position, the pin engages the drawbar so as to be able to couple the tractor to the trailing implement, and when the actuator is in the second position, the pin is disengaged from the drawbar so that the tractor is not coupled to the trailing implement.

2. The tractor hitch of claim 1, further comprising a fulcrum arm which is rotatably attached to the actuator and attached to the lever arm at the rotatable attachment to the base such that a linear movement of the actuator is translated by the fulcrum arm to rotatable movement of the lever arm about the rotatable attachment.

3. The tractor hitch of claim 2, wherein the lever arm is rotatably and slidably attached to the pin, and the rotatable and slidable attachment to the pin allows the pin to pivot and move laterally with respect to the lever arm.

4. The tractor hitch system of claim 3, wherein the actuator is telescoping so as to move between the first position and the second position, and wherein the first position is a retracted position and the second position is an extended position.

5. The tractor hitch system of claim 4, wherein the drawbar comprises an upper plate and lower plate, which are parallel and spaced apart to form a gap between the upper plate and lower plate, and the upper plate has an upper aperture opposing a lower aperture on the lower plate, and wherein when the base is mounted on the drawbar the pin is oriented with respect to the apertures such that, when the actuator is in the first position, the pin extends across the gap with a first portion of the pin lodged in the upper aperture and a second portion of the pin lodged in the lower aperture, and when the actuator is in the second position, the pin is lifted out of the lower aperture and does not extend into the gap.

6. The tractor hitch system of claim 5, further comprising:
    a power system for supplying electrical power to the actuator to power movement of the actuator between the first position and the second position;
    a controller for the power system including a trigger operable to move the actuator between the first position and the second position.

7. The tractor hitch system of claim 1, wherein the lever arm is rotatably attached to the actuator, and rotatably and slidably attached to the pin, wherein the rotatable and slidable attachment to the pin allows the pin to pivot and move laterally with respect to the lever arm.

8. The tractor hitch system of claim 7, further wherein the base includes an actuator stand extending upward from the drawbar when the base is mounted on the drawbar.

9. The tractor hitch system of claim 8, wherein the drawbar comprises an upper plate and lower plate, which are parallel and spaced apart to form a gap between the upper plate and lower plate, and the upper plate has an upper aperture opposing a lower aperture on the lower plate, and wherein when the base is mounted on the drawbar the pin is oriented with respect to the apertures such that, when the actuator is in the first position, the pin extends across the gap with a first portion of the pin lodged in the upper aperture and a second portion of the pin lodged in the lower aperture, and when the actuator is in the second position, the pin is lifted out of the lower aperture and does not extend into the gap.

10. The tractor hitch system of claim 9, wherein the pin has a flange and a rod projecting from the flange and the rod engages the drawbar.

11. The tractor hitch system of claim 10, wherein the actuator is telescoping so as to move between the first position and the second position, and wherein the first position is a retracted position and the second position is an extended position.

12. The tractor hitch system of claim 11, further comprising:
    a power system for supplying electrical power to the actuator to power movement of the actuator between the retracted position and the extended position;
    a controller for the power system including a trigger, which is remote from the pin and actuator, and which operable to move the actuator between the retracted position and the extended position.

13. A method for hitching a tractor to a trailing implement, comprising:
    activating an actuator wherein the actuator moves between a first position and a second position;
    rotating a lever arm about a rotatable attachment in response to moving the actuator between the first position and the second position; and
    moving a pin between a raised position and a lowered position in response to rotating the lever arm, wherein the lever arm is attached to the pin so as to allow the pin to pivot and move laterally with respect to the lever arm during the movement of the pin such that, when the actuator is in the first position, the pin engages a drawbar of a tractor so as to be able to couple the tractor to the trailing implement, and when the actuator is in the second position, the pin is disengaged from the drawbar so that the tractor is not coupled to the trailing implement.

14. The method of claim 13, further comprising moving a fulcrum arm in response to moving the actuator between the first position and the second position, wherein linear movement of the actuator is translated by the fulcrum arm to rotatable movement of the lever arm about the rotatable attachment.

* * * * *